United States Patent Office.

E. P. TAYLOR, OF ST. LOUIS, MISSOURI.

Letters Patent No. 79,612, dated July 7, 1868.

IMPROVED APPARATUS FOR HARDENING STONE.

The Schedule referred to in these Letters Patent and making part of the same.

TO ALL WHOM IT MAY CONCERN:

Be it known that I, E. P. TAYLOR, of St. Louis, in the county of St. Louis, and State of Missouri, have made certain new and useful Improvements in the Process for Hardening Artificial Stone; and I do hereby declare that the following is a full and clear description thereof, reference being had to the accompanying drawings, and to the letters of reference marked thereon.

In the usual processes for making artificial stone, sand is mixed with soluble silicate of soda or potash, in proper quantity, and then a solution of chloride of calcium or common salt is added, to produce an insoluble silicate. It is well known that the durability and usefulness of the artificial stone thus formed are dependent upon the perfect insolubility of its chemical constituent parts, and this, again, is dependent upon the penetration of the entire mass by the chloride of calcium.

The nature of my invention is, therefore, in such an arrangement of devices as will cause the sand and silicate of soda mixture to be fully and perfectly penetrated by said chloride of calcium solution. All chemical actions are exercised upon contact of atoms, and the action of the various devices of my said process is to bring into close contact the impregnating solution with the sand and silicate of soda, so that said chemical action shall be effected throughout the entire mass.

To accomplish the said nature of my invention, I use a vessel for containing the mixture of sand and soluble silicate, arranging the said vessel air-tight, and capable of resisting high pressure. In connection therewith I use an air-pump, wherewith a vacuum is created in the charging-vessel aforesaid.

I am fully aware that these devices have been used in processes for tanning, and similar processes, and I do therefore disclaim said devices, and do hereby declare that the special nature of my invention is in adding to the devices aforesaid a force-pump, wherewith the impregnating-fluid (be the same chloride of calcium or any other,) may be effectually forced into said charging-vessel, and also be thus effectually caused to penetrate the preparatory sand and silicate mixture; and the special nature of this invention is furthermore in the mechanical devices necessary to effect the purposes aforesaid, as will now be more fully explained.

To enable those skilled in these arts to make and use my said process, I will now describe the same, referring herein to the drawings, of which—

Figure 1 is a longitudinal sectional elevation, and

Figure 2 is a transverse section.

I use a charging-cylinder, A, of wrought or cast iron, the inner surface of which I coat with red lead and boiled-oil paint, so that it may the better resist the chemical action of the impregnating-fluid. In said cylinder I arrange a track, A', upon which trucks holding the prepared mixtures to be impregnated and solidified are placed. When the cylinder A has been charged with the mixture it must be closed air-tight.

The air in said cylinder A is thereupon exhausted by means of the air-pump B, arranged in the usual manner, and withdrawing the air by the pipe B'. When the proper vacuum has been reached, which will be indicated by the vacuum-gauge B², the stop-cock or valve $b$ of the pipe B' is closed. It will be well to permit the parts to remain undisturbed for thirty to sixty minutes. Thereupon I charge the cylinder A with the impregnating-fluid. This (which is usually chloride of calcium,) is contained in the tank C, the fluid passing into the cylinder A by pipes C¹ and C², having stop-cocks $c$. When the cylinder is filled, the stop-cocks $c$ are closed. It will be seen that the atmospheric pressure, acting upon the fluid in the tank C, forces the said fluid into the cylinder A, but owing to the nature of the sand and soluble silicate of soda mixture, a deep penetration of its mass by said impregnating-fluid does not take place.

To effect a more perfect penetration, I use the force-pump D, arranged in the usual manner, and drawing its supply, by the pipe D¹, from said tank C. By the stroke of said pump the impregnating-fluid is forced, by the pipe D², into the cylinder A, and thus a pressure corresponding to the power of the force-pump is obtained. The said pipes D¹ and D² are arranged with stop-cocks $d$. The pressure obtained in the cylinder by the force-pump action is measured by the pressure-gauge E. In order that as the impregnating-substance penetrates the sand-mixture the pressure may be held constant by an inflow of fluid, I arrange upon the piston of the force-pump a weight, $d'$, which supports a uniformity of pressure by the piston upon the fluid in the cylinder A.

When the substances in A have thus been sufficiently acted upon, I open the stop-cocks $c$, to discharge the surplus impregnating-fluid. An air-cock, F, then lets in a supply of air, and the cylinder A may be opened and the impregnated mass withdrawn.

I do herein in nowise confine myself to the application of my said devices and process to hardening artificial stone, but assert that the nature of my invention includes its application to sundry other processes of impregnation, such as tanning, burnetizing, &c.

Having thus fully described my invention, what I claim, is—

The force-pump D, with weighted piston $d'$, in combination with cylinder A, air-pump B, and tank C, the whole being operated in the manner described.

In testimony of which invention, I hereunto set my hand, in presence of—

E. P. TAYLOR.

Witnesses:
   Geo. P. Herthel, Jr.,
   M. Randolph.